(12) United States Patent
Mertens et al.

(10) Patent No.: US 7,074,384 B2
(45) Date of Patent: Jul. 11, 2006

(54) CRYSTALLINE MOLECULAR SIEVES

(75) Inventors: Machteld Maria Mertens, Boortmeerbeek (BE); Johan Adriaan Martens, Huldenberg (BE); Raman Rayishankar, Singapore (SG); Christine Eva Antiona Kirschhock, Leuven (BE); Pierre August Jacobs, Gooik (BE); Antonie Jan Bons, Kessel-Lo (BE); Wilfried J. Mortier, Kessel-Lo (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 106 days.

(21) Appl. No.: 10/433,674

(22) PCT Filed: Dec. 7, 2001

(86) PCT No.: PCT/GB01/05425

§ 371 (c)(1),
(2), (4) Date: Nov. 17, 2003

(87) PCT Pub. No.: WO02/46099

PCT Pub. Date: Jun. 13, 2002

(65) Prior Publication Data

US 2004/0101475 A1    May 27, 2004

(30) Foreign Application Priority Data

Dec. 8, 2000   (EP) ................................. 00310924
Apr. 25, 2001  (EP) ................................. 01303760
Jul. 20, 2001  (GB) ................................. 0117803.7

(51) Int. Cl.
   *C01B 39/48* (2006.01)
(52) U.S. Cl. .................. 423/718; 423/708; 423/329.1; 208/111.01; 208/27; 585/533
(58) Field of Classification Search ............. 423/329.1, 423/718, 708; 208/27, 111.01; 585/533
See application file for complete search history.

(56) References Cited

U.S. PATENT DOCUMENTS

| | | | |
|---|---|---|---|
| 3,702,886 A * | 11/1972 | Argauer ...................... 423/705 |
| 4,046,859 A | 9/1977 | Plank et al. ................. 423/328 |
| 5,254,515 A * | 10/1993 | Imai ............................. 502/64 |
| 6,136,290 A | 10/2000 | Benazzi et al. ............. 423/705 |
| 6,696,033 B1 * | 2/2004 | Corma Canos et al. .. 423/329.1 |
| 6,756,030 B1 * | 6/2004 | Rohde et al. ............... 423/718 |
| 2004/0186337 A1 * | 9/2004 | Rohde et al. ............... 585/739 |

FOREIGN PATENT DOCUMENTS

| | | |
|---|---|---|
| EP | 0 042 226 | 12/1981 |
| EP | 0 174 121 | 3/1986 |
| EP | 0377 291 | 7/1990 |
| EP | 0 463 768 | 1/1992 |
| WO | WO 97 12838 | 4/1997 |

* cited by examiner

*Primary Examiner*—David Sample

(57) ABSTRACT

A new family of crystalline molecular sieves is described having a characteristic XRD pattern as illustrated in FIG. 1, and having three sharp peaks at $2\theta$ ($CuK_\alpha$) of 8.82, 12.44, and 23.01.

36 Claims, 4 Drawing Sheets

CRYSTALLINE MOLECULAR SIEVES

CROSS-REFERENCE TO RELATED APPLICATIONS

This application claims priority to European applications EP 00310924.6, filed Dec. 8, 2000 and EP 01303760.1, filed Apr. 25, 2001, and to GB 0117803.7, filed Jul. 20, 2001, all of which are fully incorporated herein.

This invention relates to a family of crystalline molecular sieves, more especially zeolites, to a process for their manufacture, and to their use in separation and conversion of organic compounds.

The term "zeolite" is generally used for crystalline molecular sieves based on silicon and aluminium, but it is recognized in the art that silicon may be replaced in whole or in part, in particular by germanium, and that aluminium may similarly be replaced in whole or in part, in particular by boron, gallium, chromium, and iron, materials containing such replacement lattice elements also being termed zeolites, and the term is used in the broader sense in this specification.

Crystalline molecular sieves, both natural and synthetic, have various utilities in separating components of mixtures of organic compounds, and catalysing conversions of one type of organic compound to another.

Zeolites are either crystallographically pure phases or disordered structures such as polytypical intergrowths of two or more phases. Zeolite beta (*BEA topology) and the FAU/EMT polytypical intergrowths are examples of the latter. Such a polytypical intergrowth of related structures is referred to as a "family".

In a first aspect, the present invention provides a crystalline molecular sieve family, each member of said family having a characteristic X-ray diffraction pattern (XRD) which has, as the only sharp peaks in the 2θ (CuK$_\alpha$) region extending from 5 to 23.5, three sharp peaks at 2θ (CuK$_\alpha$) of 8.82±0.1, 12.44±0.5 and 23.01±0.1. While all members of the family are characterized by these same three sharp peaks in their XRD spectrum some members also have a fourth sharp peak at 2θ (CuK$_\alpha$) of 25.02±0.1. These are the only sharp peaks in the 2θ (CuK$_\alpha$) region extending from 5 to 25.5.

The sharp peak at 23.01 is usually accompanied by an overlay of unresolved peaks, as is that at 25.02. Other features of the XRD spectra for this molecular sieve family are set out in Table 1 below.

TABLE 1

| 2θ (CuK$_\alpha$) | Intensity |
| --- | --- |
| 6 to 8.7 | w/m |
| 8.82 ± 0.1 | s |
| 12.44 ± 0.5 | m |
| 14 to 16 | m |
| 20.4 to 21.2 | w |
| 23.01 ± 0.1 | very s |
| 22.5 to 24.5 | m/s |
| 25.02 ± 0.1 | variable - may or may not be present |
| 25.5 to 27 | m | w = weak
m = medium
s = strong

Figure 1:
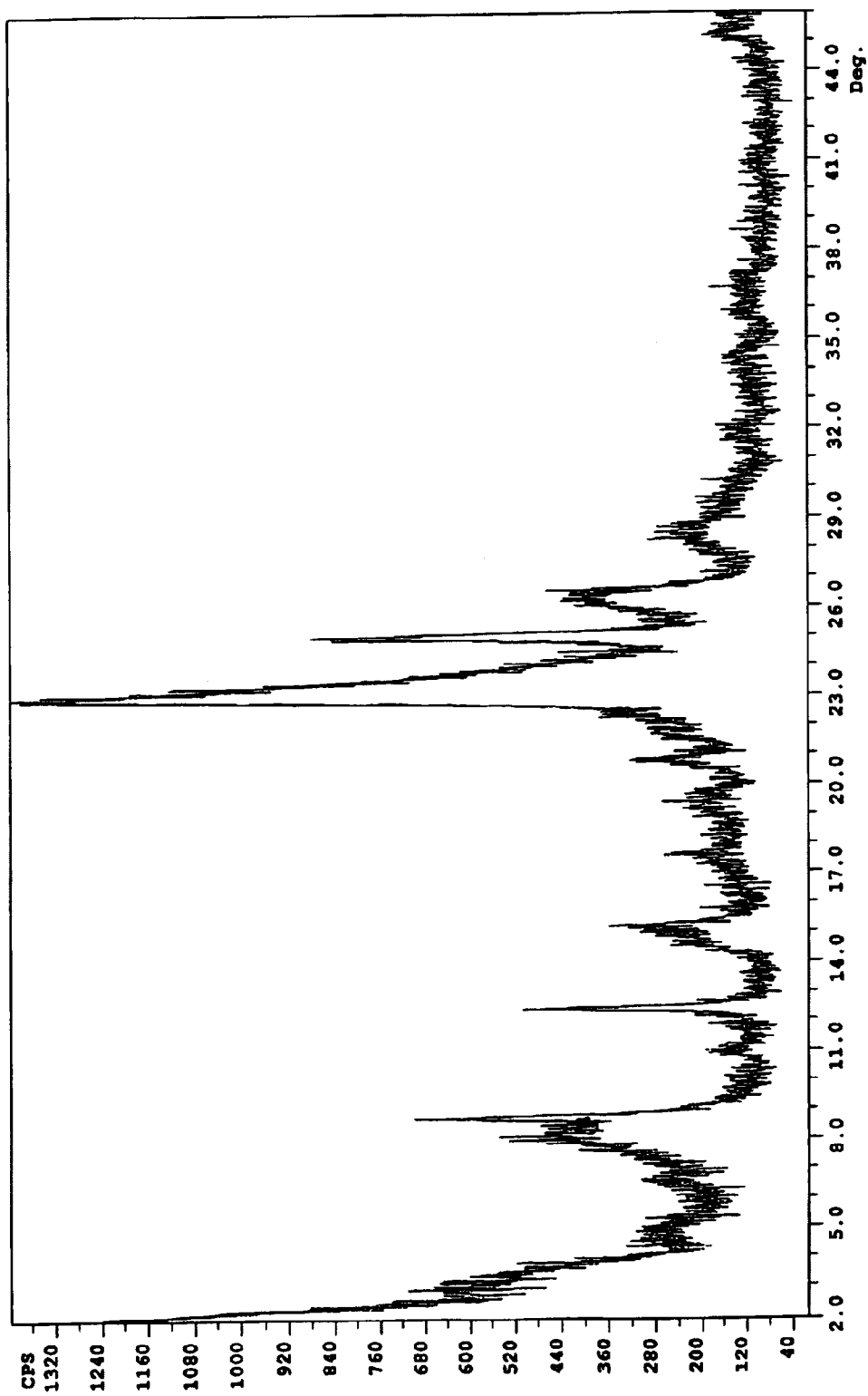

FIG. 1 shows the XRD spectrum of a representative zeolite family member according to the present invention, in the as-synthesized condition. This family member has the fourth sharp peak at 25.02±0.1. The nature of the peaks of FIG. 1 is described in Table 2.

TABLE 2

| 2θ | Intensity | Nature |
| --- | --- | --- |
| 6 to 8.7 | w/m | Unresolved series of broad peaks |
| 8.82 ± 0.1 | s | Sharp |
| 12.44 ± 0.5 | m | Sharp |
| 14 to 16 | m | Unresolved series of broad peaks |
| 20.4 to 21.2 | w | Broad peak |
| 23.01 ± 0.1 | very s | Sharp |
| 22.5 to 24.5 | m/s | Unresolved series of broad peaks |
| 25.02 ± 0.1 | s | Sharp |
| 25.5 to 27 | m | Unresolved series of broad peaks |

Throughout this specification, including the claims, XRD data are obtained using the Kα radiation of copper, using an X-ray powder diffractometer with Bragg-Brentano geometry.

For comparison, it may be noted that the XRD of ZSM-48 as described in U.S. Pat. No. 4,448,675 has major peaks in the 5 to 25.5 2θ region at 7.48, 8.67, 21.06, and 22.83, while ZSM-57, as described in EP-A-174 121, and IM-5, as described in U.S. Pat. No. 6,136,290, have numerous major peaks in that region.

Without wishing to be bound by any theory, it is believed that the framework of the molecular sieve of the invention may be represented on a molecular scale as a series of substantially parallel planar layers, the layers being substantially identical, each layer providing the framework atoms for the upper half of a channel of the sieve lying below it and for the lower half of a channel lying above it. The atoms of the layer may be linked to the atoms of an adjacent layer in a number of different ways. On a somewhat larger scale, a number of such layers form a lamella a few nanometers in thickness and adjacent lamellae may have different crystal structures or orientations, the structures being related so that intergrowths are possible, several lamellae forming a flake-like particle. The structure of a given product of a family member will accordingly be disordered, but in a relatively systematic way. This is reflected in the XRD of the product, which has a limited number of sharp peaks, representing the part of the crystal structure that is common to all family members, and a number of unresolvable series of broad peaks, each peak representing the part of the crystal structure that varies according to the manner in which adjacent layers and lamellae are linked.

Transmission Electron Microscopy (TEM) of as-synthesized and calcined samples of the molecular sieves of the invention confirms the presence of thin flakes and shows various internal stacking irregularities of the crystalline layers within the flakes. TEM micrographs were obtained by embedding the samples in acrylic resin (LR White Hard Grade by the London Resin Company) using vacuum impregnation followed by thermal curing at 80° C. The embedded material is cut into thin slices using an ultramicrotome. TEM analysis is carried out using a Philips CM-12T TEM operating at 120 kV.

Figure 2:
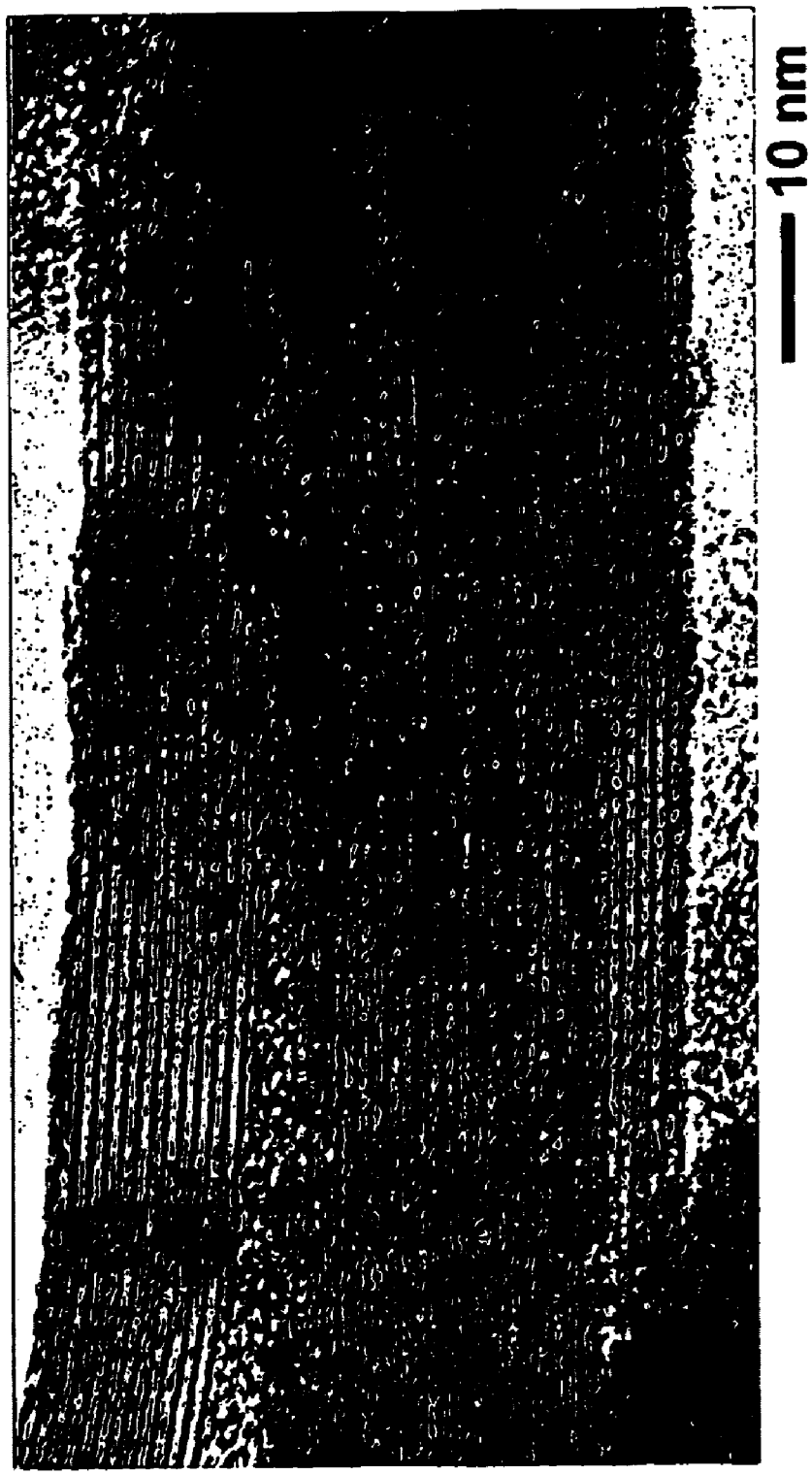

FIG. 2 is a TEM micrograph of a calcined sample, showing a flake-shaped particle. The lattice fringes indicate that the flake is crystalline. The crystal planes forming the lattice fringes are sometimes split or bent.

Figure 3:

FIG. 3 is a further TEM micrograph of the calcined sample, showing a flake-shaped particle. This image shows two different lattice fringe structures, as indicated by the schematic representations (b) and (c). This indicates that this flake consists of two layers with different crystal structures or different crystal orientations.

Figure 4:
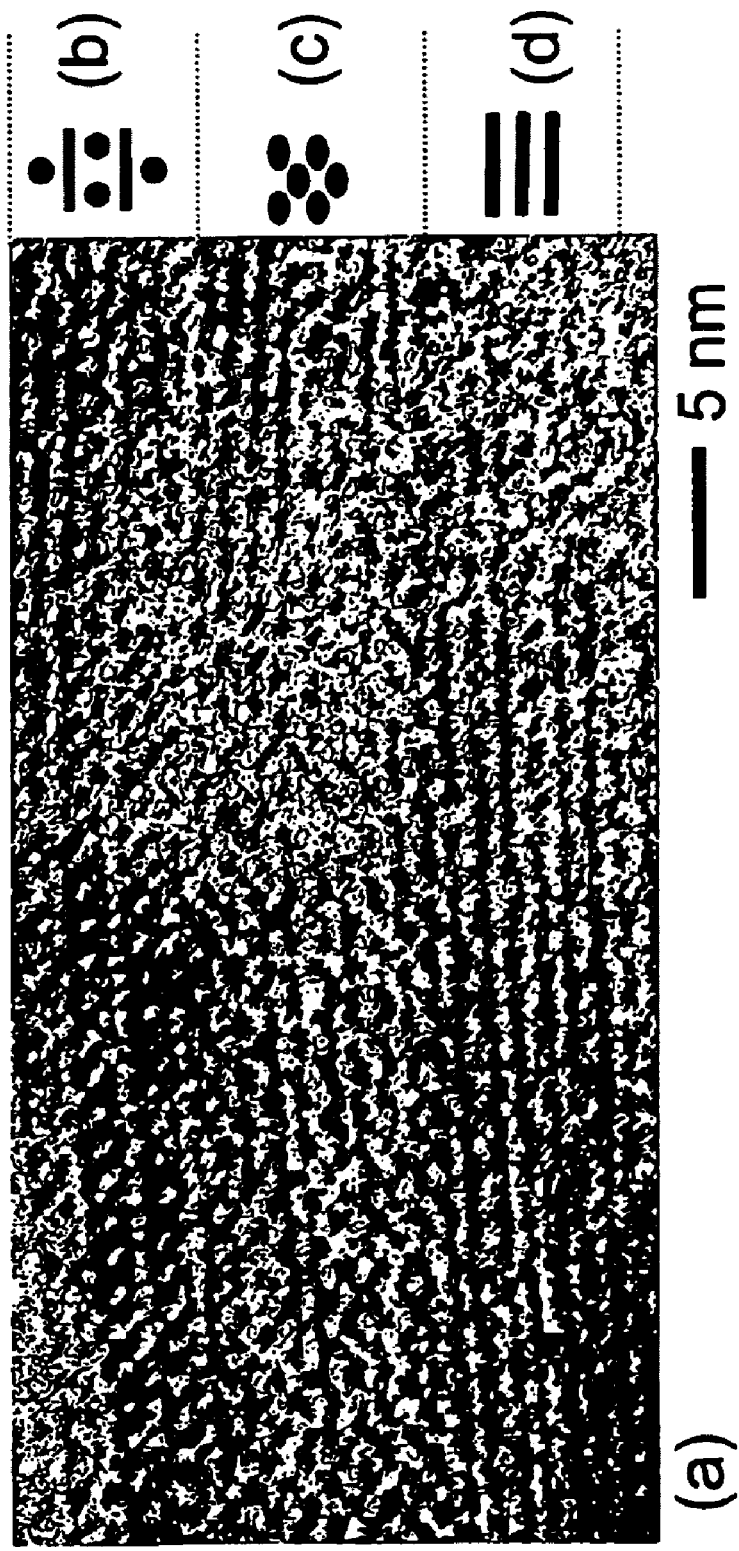

FIG. 4 is a TEM micrograph of the calcined sample, showing a flake-shaped particle. This image shows three different lattice image structures, as indicated by the schematic representations (b), (c) and (d). This indicates that this flake consists of three layers with different crystal structures or different crystal orientations.

Both X-ray diffraction observations and the TEM observations indicate that the flake-shaped particles of the material are built up of layers of a few nanometers in thickness.

The structure within a layer is highly ordered and crystalline. This leads to the sharp peaks observed in X-ray diffraction patterns, and to the ordered structure image within the layers observed in TEM micrographs.

Layers of different orientations or different structures may be stacked to form a flake. This leads to the broad peaks observed in X-ray diffraction patterns, and to variations in image structure observed in TEM micrographs.

The individual layers may have different internal crystal structures, however, the structures are related such that intergrowths of different layers are possible. Different stacking sequences of such related layers will lead to different, albeit related, materials. Hence the material is properly described as a family of crystal structures.

The molecular sieve family of the invention is identified as COK-5.

In a second aspect of the invention, there is provided a crystalline molecular sieve having a refined constraint index, CI°, in the range of from 2.5 to 3 and an $EC_8$ criterion in the range of from 2 to 3. The measurement of refined constraint index is described by P. A. Jacobs and J. A. Martens, Pure & Applied Chem., 1986, 58, 1329, and measurement of $EC_8$ is described by J. A. Martens, M. Tielen, P. A. Jacobs and J. Weitkamp, Zeolites 1984, 4, 98. Advantageously, the crystalline molecular sieve also has a dimensionality index greater than 5. Some family members have a dimensionality index in the range of from 17 to 19. The dimensionality index is defined in M. M. Olken and J. M. Garces, Proc. $9^{th}$ Intern. Zeolite Conference, Montreal, 1992, ed. R. von Ballmoos et al, Vol. II, 559.

In a third aspect of the invention, there is provided a crystalline molecular sieve having the characteristics defined with reference to the first aspect and also those defined with reference to the second aspect.

Advantageously, the crystalline molecular sieve according to all aspects of the invention, when in the form of an aluminosilicate, has a molar ratio of $SiO_2:Al_2O_3$ within the range of from 20 to 70:1, and preferably within the range of from 30 to 60:1.

As indicated above, silicon may be replaced in whole or in part by germanium, and aluminium may likewise be replaced, preferably by gallium.

The invention also provides a process for the manufacture of the crystalline molecular sieve of the invention which comprises subjecting to hydrothermal treatment a synthesis mixture having a composition within the molar ranges of

| 15 to 90 | $SiO_2:Al_2O_3$ |
| 20 to 60 | $H_2O:SiO_2$ |
| 0.1 to 0.4 | $M^+:SiO_2$ | together with an organic structure directing agent (template), advantageously within the molar ranges of

| 40 to 70 | $SiO_2:Al_2O_3$ |
| 35 to 40 | $H_2O:SiO_2$ |
| 0.27 to 0.34 | $M^+:SiO_2$ | together with an organic structure-directing agent, and preferably within the molar ranges of

| 57 to 66 | $SiO_2:Al_2O_3$ |
| 38 to 40 | $H_2O:SiO_2$ |
| 0.29 to 0.32 | $M^+:SiO_2$ | together with an organic structure-directing agent.

The invention further provides a process for the manufacture of a crystalline molecular sieve which comprises subjecting to hydrothermal treatment a synthesis mixture having a composition within the molar ranges of

| 40 to 70 | $SiO_2:Al_2O_3$ |
| 35 to 39.5 | $H_2O:SiO_2$ |
| 0.27 to 0.34 | $M^+:SiO_2$, | advantageously within the molar ranges of

| 57 to 66 | $SiO_2:Al_2O_3$ |
| 38 to 39.5 | $H_2O:SiO_2$ |
| 0.29 to 0.32 | $M^+:SiO_2$ | together with an organic structure-directing agent.

M represents an alkali metal, advantageously sodium. Advantageously, in each case, the template is present in a molar proportion of 0.07 to 0.20:1 based on $SiO_2$, preferably 0.08 to 0.12:1, most preferably 0.09 to 0.10:1, and typically about 0.094:1. Advantageously, the template is a compound having a cation of the general formula $R^2R^3R^4N^+R^1N^+R^5R^6R^7$, and an anion of the formula $R^8-R^{9-}$ wherein $R^1$ represents a preferably linear alkylene radical having from 4 to 6, advantageously 5, carbon atoms, $R^2,R^3,R^4,R^5,R^6$ and $R^7$, independently represent an alkyl radical having 1 to 4, preferably 2, carbon atoms, and $R^8$ and $R^9$ represent a counter balancing anion. The anion may be, for example, carboxylate, e.g., acetate; hydroxide or, advantageously, a halide, preferably bromide.

Preferred is a N,N,N,$N^1$,$N^1$,$N^1$-hexaethyl pentane diammonium halide, also known as Diquat-5, preferably the bromide.

Hydrothermal treatment may be carried out under the usual zeolite synthesis conditions. Advantageously used are temperatures within the range of from 100° C. to 200° C., preferably from 125° C. to 175° C., and conveniently at about 150° C. Temperature may be increased, gradually or stepwise, during treatment. Advantageously, a time within the range of from 100 to 300 hours, preferably within the range of from 150 to 250 hours, and conveniently from 7 to 10 days is employed, lower temperatures corresponding to longer times.

Treatment may be carried out with or without agitation, for example stirring or tumbling (rotating the vessel about a horizontal axis), but is advantageously carried out with agitation.

The procedure may include an ageing period, either at room temperature or, preferably, at a moderately elevated temperature, lower than that used for the hydrothermal treatment.

The sources of the various elements required in the final product may be any of those in commercial use or described in the literature, as may the method of preparation of the synthesis mixture.

For example, the source of silicon may be a silicate, e.g., an alkali metal silicate, a tetraalkyl orthosilicate, or an aqueous colloidal suspension of silica, for example one sold by E.I. du Pont de Nemours under the trade name Ludox. Ludox HS-40 is a sodium-containing product while Ludox AS-40, which is presently preferred, contains little sodium.

The source of aluminium is preferably hydrated alumina or sodium aluminate. Other aluminium sources include, for example, a water-soluble aluminium salt, e.g., aluminium sulphate, or an alkoxide, e.g., aluminium isopropoxide, or aluminium metal, e.g., in the form of chips.

The alkali metal source is advantageously sodium hydroxide or sodium aluminate.

The template is advantageously supplied in the form of an aqueous solution.

The synthesis may be aided by seeds from a previous synthesis, the seeds being advantageously colloidal or near-colloidal, and advantageously present in a proportion of from 0.001% to 1% by weight, based on the total weight of synthesis mixture.

The direct product of the synthesis described above may be calcined, cation-exchanged, and otherwise treated as is known in the art. Alkali metal cations in the as-prepared or calcined form may be removed, for example by treatment with concentrated acids, e.g., HCl, or with a fugitive base, e.g., an ammonium compound, to provide the material in its hydrogen form. The XRD pattern of COK-5 is preserved, possibly with some minor shifts and intensity changes, through ion exchange and thermal treatment. Other minor variations may result from changes in stoichiometry.

The crystalline molecular sieve of the invention, COK-5, forms as flake-like particles.

The products of the invention, if required after cation exchange and/or calcining, have utility as catalyst precursors, catalysts, and separation and absorption media. They are especially useful in numerous hydrocarbon conversions, separations and absorptions. They may be used alone, or in admixture with other molecular sieves, in particulate form, supported or unsupported, or in the form of a supported layer. Hydrocarbon conversions include, for example, cracking, reforming, hydrofining, aromatization, oligomerization (e.g., di- and trimerization, especially of olefins having 3 to 6 carbon atoms, more especially butene trimerization), isomerization, dewaxing, and hydrocracking (e.g., naphtha to light olefins, higher to lower molecular weight hydrocarbons, alkylation, transalkylation, disproportionation or isomerization of aromatics). Other conversions include the reaction of alcohols with olefins and the conversion of oxygenates to hydrocarbons.

EXAMPLES

The following numbered examples, in which all parts and percentages are by weight unless otherwise indicated, illustrate the invention.

Example A

Synthesis of Template 1 mole of 1,5-dibromopentane and 2 moles of triethylamine are dissolved in ethanol and refluxed overnight. The resulting solution was concentrated and finally evaporated to dryness under vacuum at 35° C. The white product was recrystallized from ether and identified as $N,N,N,N^1,N^1,N^1$-hexaethylpentane diammonium dibromide (HEPDD).

Example 1

22 parts of colloidal silica (Ludox AS-40), 1.5 parts sodium hydroxide (99%) and 26 parts water were formed into an initial mixture by stirring for 15 minutes. A solution of 0.42 parts of sodium aluminate (Riedel-De Haen: 54% $Al_2O_3$; 41% $Na_2O$; 4.98 $H_2O$) in 26 parts of water was added to the initial mixture, and stirred for 10 minutes. A solution of 5.9 parts of HEPDD in 36 parts of water was slowly added to the mixture and the final resulting mixture stirred for 15 minutes to give a molar composition of:

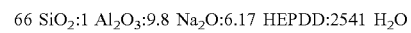

66 $SiO_2$:1 $Al_2O_3$:9.8 $Na_2O$:6.17 HEPDD:2541 $H_2O$

The synthesis mixture was poured into a stainless steel autoclave and heated in a 150° C. oven for 10 days. The solid product was recovered from the reaction mixture, washed, and dried in a 60° C. oven for 3 hours.

An XRD of the as-synthesized material is shown in FIG. 1. This spectrum was recorded on a SCINTAG X2 XRD diffractometer with Bragg-Brentano geometry, using the Kα radiation of copper, a 2 mm/4 mm divergence slits assembly, a 0.5/0.2 mm receiving slits assembly and a diffractometer radius of 25 cm. The spectrum was recorded with a step size of 0.010°, a count time of 0.300 sec, a range of 2.00–46.00° and a continuous scan rate of 2.00 degrees per minute.

Those skilled in the art will recognize on examination of the XRD of FIG. 1 that its only sharp peaks in the 2θ(CuKα) region extending from 5 to 23.5 are those at ~8.82, ~12.44, and ~23.01, there being a further sharp peak at ~25.02. The sharp peaks of FIG. 1 are such that the part of their heights subtended by a 2θ range of 0.2° is substantially greater than the prevailing noise level. The XRD of FIG. 1 contains a number of additional broad peaks, either individual or in the form of an unresolved series.

A portion of the sample was subjected to thermogravimetric analysis (TGA) and showed a weight loss of 8.3% between 270 and 650° C. A further portion was calcined at 550° C., initially under nitrogen for 2 hours then under oxygen for a further 8 hours. Chemical analysis of the calcined sample gave in molar ratios:

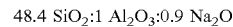

48.4 $SiO_2$:1 $Al_2O_3$:0.9 $Na_2O$

The specific surface area of a portion of the calcined material was measured by nitrogen adsorption at 77° K. The BET surface area was 345 $m^2/g$, and the micropore volume was 0.11 ml/g.

A portion of the as synthesized sample was mixed with KBr, made into a wafer, and the FTIR spectrum analysed.

Bands at 569 cm$^{-1}$ and 545 cm$^{-1}$, characteristic of pentasil vibrations, and at 3734 cm$^{-1}$, characteristic of surface SiOH groups, were noted.

Scanning election microscopy (SEM) of both as-synthesized and calcined samples indicated that the samples were flakes of thickness about 0.1 μm.

Example 2

The hydrogen form of the new zeolite, COK-5, was obtained as follows. A portion of the calcined sample was refluxed with a molar ammonium acetate solution for 8 hours, filtered, washed with distilled water and dried at 60° C. for 2 hours; this procedure was repeated three times. The final dried material was calcined at 450° C., initially for 2 hours under nitrogen and finally under oxygen for 6 hours.

Various characteristics of the hydrogen form of the new zeolite were determined by the n-decane catalytic conversion test after impregnating a sample with Pt(NH$_3$)$_4$Cl$_2$ to obtain a 0.5% Pt loading, the Pt-loaded zeolite first being heated at 400° C. under oxygen then hydrogen for 1 hour.

The decane test was performed as described in J. A. Martens and P. A. Jacobs, Zeolites 1986, 6, 334; J. A. Martens, M. Tielen, P. A. Jacobs and J. Weitkamp, Zeolites 1984, 4, 98; and W. Souverijns, W. Verrelst, G. Vanbutsele, J. A. Martens and P. A. Jacobs, J. Chem. Soc. Chem. Commun., 1994, 1671.

The sample of COK-5 prepared as described above was compared with other zeolites and found to exhibit a unique combination of refined constraint index (CI°=2.7) with an EC$_8$ criterion of 2.5 and a dimensionality index of 17.9, as shown in Table 5 below.

TABLE 5

| Zeolite | Structure Type | CI° | EC$_8$ | DI |
| --- | --- | --- | --- | --- |
| ZSM-35 | FER | 10.3 | 0 | 13 |
| ZSM-22 | TON | 14.5 | 0 | 19 |
| MCM-22 | MWW | 4.6 | 0.7 | 12 |
| Beta | BEA | 1.4 | 7.1 | 1.0 |
| ZSM-57 | MFS | 3.0 | 1.7 | 15.2 |
| ZSM-12 | MTW | 2.4 | 6 | 13 |
| USY | FAU | 1.5 | 12.6 | 0 |
| Mordenite | MOR | 1.8 | 6.5 | 33 |
| COK-5 | — | 2.7 | 2.5 | 17.9 |

CI°: Refined Constraint Index
DI: Dimensionality Index
EC$_8$: Ethyloctane Index Example 3

This example describes a further synthesis of COK-5.

A solution of 2.53 parts NaOH (ALCOA, 98.5%) and 0.51 parts of Al(OH)$_3$ in 40.06 parts of water was prepared. A template solution containing 8.16 parts of HEPDD in 30.20 parts of water was also prepared. The template solution was added to a mixture of 30.05 parts of colloidal silica (Ludox AS-40) and 32.14 parts of water together with 11.53 parts of rinse water and stirred until homogeneous. The sodium/aluminium solution was then added with 9.83 parts of rinse water and stirred. The resulting homogeneous mixture had the molar composition:

62.5 SiO$_2$:1 Al$_2$O$_3$:9.75 Na$_2$O:5;88 HEPDD:2467 H$_2$O

The composition was heated in an autoclave to 150° C. over 2 hours, and maintained at that temperature with tumbling at 60 rpm for 168 hours.

The resulting solid product was washed and dried, and confirmed by XRD as being identical to that of Example 1.

We claim:

1. A crystalline molecular sieve having a characteristic X-ray diffraction pattern (XRD) which has, as the only sharp peaks in the 2θ (CuK$_\alpha$) region extending from 5 to 23.5, three sharp peaks at 2θ (CuK$_\alpha$) of 8.82±0.1, 12.44±0.5 and 23.01±0.1.

2. The crystalline molecular sieve as claimed in claim 1 which has, as the only sharp peaks in the 2θ (CuK$_\alpha$) region extending from 5 to 25.5, four sharp peaks at 2θ (CuK$_\alpha$) of 8.82±0.1, 12.44±0.5, 23.01±0.1 and 25.02±0.1.

3. The sieve as claimed in claim 1, which is an aluminosilicate having a molar ratio of SiO$_2$:Al$_2$O$_3$ within the range of from 20:1 to 70:1.

4. A sieve as claimed in claim 3 wherein said molar ratio range is from 30:1 to 60:1.

5. The sieve as claimed in claim 1, which is in the hydrogen form.

6. The sieve as claimed in claim 1, which is in catalytic form.

7. The sieve as claimed in claim 1, having a refined constraint index of from 2.5 to 3 and an EC$_8$ of from 2 to 3.

8. The sieve as claimed in claim 7, having a refined constraint index of about 2.7 and an EC$_8$ of about 2.5.

9. The sieve as claimed in claim 7, which also has a dimensionality index greater than 5.

10. The sieve as claimed in claim 7, which has a dimensionality index of from 17 to 19.

11. A crystalline molecular sieve having a characteristic X-ray diffraction pattern (XRD) as set out in Table 1 below:

TABLE 1

| 2θ (CuK$_\alpha$) | Intensity |
| --- | --- |
| 6 to 8.7 | w/m |
| 8.82 ± 0.1 | s |
| 12.44 ± 0.5 | m |
| 14 to 16 | m |
| 20.4 to 21.2 | w |
| 23.01 ± 0.1 | very s |
| 22.5 to 24.5 | m/s |
| 25.02 ± 0.1 | variable; may or may not be present |
| 25.5 to 27 | m | w = weak
m = medium
s = strong.

12. The sieve as claimed in claim 11, which is an aluminosilicate having a molar ratio of SiO$_2$:Al$_2$O$_3$ within the range of from 20:1 to 70:1.

13. The sieve as claimed in claim 11, which is in the hydrogen form.

14. The sieve as claimed in claim 11, which is in catalytic form.

15. The sieve as claimed in claim 11, having a refined constraint index of from 2.5 to 3 and an EC$_8$ of from 2 to 3.

16. The sieve as claimed in claim 15, having a refined constraint index of about 2.7 and an EC$_8$ of about 2.5.

17. The sieve as claimed in claim 15, which also has a dimensionality index greater than 5.

18. The sieve as claimed in claim 15, which has a dimensionality index of from 17 to 19.

19. A process for the manufacture of a crystalline molecular sieve as defined in claim 1, which comprises subjecting to hydrothermal treatment a synthesis mixture having a composition within the molar ranges of

| | |
|---|---|
| 15 to 90 | SiO$_2$:Al$_2$O$_3$ |
| 20 to 60 | H$_2$O:SiO$_2$ |
| 0.1 to 0.4 | M$^+$:SiO$_2$ | together with an organic structure directing agent, wherein M represents an alkali metal.

20. A process as claimed in claim 19, wherein the synthesis mixture has a composition within the molar ranges of

| | |
|---|---|
| 40 to 70 | SiO$_2$:Al$_2$O$_3$ |
| 35 to 40 | H$_2$O:SiO$_2$ |
| 0.27 to 0.34 | M$^+$:SiO$_2$. |

21. The process as claimed in claim 20, wherein the molar ratio of H$_2$O:SiO$_2$ is within the range of 35:1 to 39.5:1.

22. The process as claimed in claim 20, wherein the synthesis mixture has a composition within the molar ranges of

| | |
|---|---|
| 57 to 66 | SiO$_2$:Al$_2$O$_3$ |
| 38 to 40 | H$_2$O:SiO$_2$ |
| 0.29 to 0.32 | M$^+$:SiO$_2$. |

23. The process as claimed in claim 22, wherein the molar ratio of H$_2$O:SiO$_2$ is within the range of 38:1 to 39.5:1.

24. The process as claimed in claim 20, wherein M represents sodium.

25. The process as claimed in claim 20, wherein the organic structure directing agent is present in a moloar proportion of 0.08:1 to 0.12:1, based on SiO$_2$, and is a compound having a cation of the general formula R$^2$R$^3$R$^4$N$^+$R$^1$N$^+$R$^5$R$^6$R$^7$ and an anion of the formula R$^8$-R$^9$- wherein R$^1$ represents an alkylene radical having from 4 to 6 carbon atoms, R$^2$,R$^3$,R$^4$,R$^5$,R$^6$ and R$^7$, independently represent an alkyl radical having 1 to 4 carbon atoms, and R$^8$ and R$^9$ independently represent hydroxide or a halogen.

26. The process as claimed in claim 25, wherein R$^1$ represents a linear alkylene radical and wherein R$^2$ to R$^7$ independently represent an ethyl radical.

27. The process as claimed in claim 20 wherein the structure directing agent comprises a N,N,N,N$^1$,N$^1$,N$^1$-hexaethylpentane diammonium halide.

28. The process as claimed in claim 20, carried out for 7 to 10 days at a temperature within the range of from 100° C. to 200° C.

29. The process as claimed in claim 20, wherein the synthesis product is subjected to a treatment selected from calcination, ion-exchange and freeing from alkali metal cations.

30. A process selected from the group consisting of organic separation, adsorption and catalysed reaction, carried out in the presence of a crystalline molecular sieve as claimed in claim 1.

31. The process as claimed in claim 30, which is selected from the group consisting of dewaxing, olefin oligomerization and hydrocracking.

32. A crystalline molecular sieve having an XRD substantially as shown in FIG. 1 herein.

33. A crystalline molecular sieve having a refined constraint index in the range of from 2.5 to 3 and an EC$_8$ in the range of from 2 to 3.

34. The sieve as claimed in claim 33, having a refined constraint index of about 2.7 and an EC$_8$ of about 2.5.

35. The sieve as claimed in claim 33, which also has a dimensionality index greater than 5.

36. The sieve as claimed in claim 35, which has a dimensionality index in the range of from 17 to 19.

* * * * *